Oct. 17, 1967     T. H. BULPITT     3,348,055
APPARATUS FOR MONITORING THE INTENSITY OF A BEAM OF RADIANT ENERGY
Filed Aug. 21, 1964

INVENTOR.
THOMAS H. BULPITT
BY *Elliott & Pastoriza*
ATTORNEYS

United States Patent Office 3,348,055
Patented Oct. 17, 1967

3,348,055
APPARATUS FOR MONITORING THE INTENSITY OF A BEAM OF RADIANT ENERGY
Thomas H. Bulpitt, Sylmar, Calif., assignor, by mesne assignments, to Textron Electronics, Inc., a corporation of Delaware
Filed Aug. 21, 1964, Ser. No. 391,178
5 Claims. (Cl. 250—212)

ABSTRACT OF THE DISCLOSURE

This disclosure relates to a device enabling the continuous monitoring of a beam of radiant energy while the beam is in use. The device comprises a transparent optical element which may constitute one of the optical pieces of the system through which the radiant energy beam passes. This optical element is provided with two coatings of dissimilar metals which are extremely thin and which will not appreciably attenuate the beam of energy passing through the optical element. Suitable conductive leads are connected to the dissimilar metallic coatings on the optical element and thermal E.M.F.'s are then measured. The voltage developed is a function of the intensity of the beam and thus a continuous monitoring can take place.

This invention relates generally to radiant energy measuring systems and more particularly to a novel method and means for continuously monitoring the intensity of a beam of radiation.

Heretofore, radiant beam intensities such as in an optical beam have been monitored by a detecting probe positioned to intercept the beam and provide an output signal which may be measured. In these instances, however, the transmission of the beam is at least partially obstructed by the probe. Therefore, the optical system is essentially useless during the monitoring period.

To avoid obstructing transmission, probe type detectors have been provided to intercept spill-over beam energy occurring about the periphery of the certain of the optical elements in the optical system. This latter method, however, will not provide signals which correlate accurately with central beam intensity, the central beam intensity being the portion of the beam about which intensity information is desired. Moreover, probes or detectors employed to intercept spill-over are often times extremely sensitive to small alignment changes in the optical system.

With the foregoing in mind, it is a primary object of the present invention to provide a method and means of monitoring the energy or intensity of a radiant energy beam in which the beam is in no way significantly obstructed and yet in which desired central beam intensity may be accurately indicated continuously.

More particularly, it is an object to provide an improved method and apparatus for monitoring a radiant energy beam which may, if desired, constitute part of the optical system itself.

Another object is to provide a radiant energy monitoring system which may be used to modify the intensity distribution of the beam.

Briefly, the method of the invention contemplates the steps of depositing multiple layers of metallic films on optical elements or suitable substrates which may be introduced into the optical system employed with the beam to be monitored. The films or layers are of dissimilar metals and will develop thermal voltages which correlate directly with the beam intensity in response to irradiation by the beam. Essentially, the invention thus contemplates the provision of a thermocouple distributed over the area of the beam to measure the heat producing effect of the beam.

In accord with further steps of the method, a compensating voltage signal is generated in response to ambient temperature and introduced into the output signal from the layers so that measurement of the output signal will serve to monitor only the beam intensity changes. The compensating thermocouple uses the same materials as the films.

In accord with preferred forms of the apparatus for carrying out the method of the invention, the films themselves may be extremely thin and transparent covering the entire surface of the optical element. An alternative structure is to provide a heavier film deposit in the form of fine lines traversing the optical element to define a mesh on the optical surface. In this latter structure, it is important that the optical element not be positioned in a focal plane of the optical system in order that there will be no inadvertent imaging of the mesh employed.

A better understanding of the method and apparatus of this invention will be had by now referring to the accompanying drawings, in which.

Figure 1:
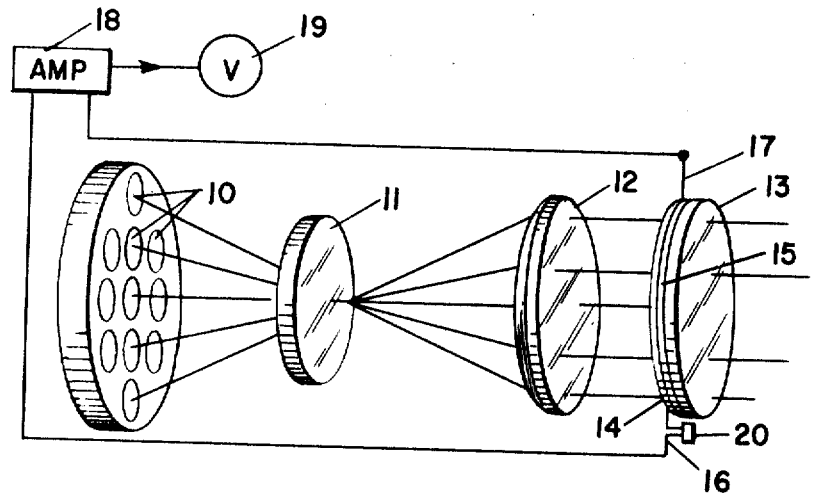
FIGURE 1 is a simplified schematic diagram of an optical system in which the monitoring method and apparatus of this invention are employed.

Referring first to FIGURE 1, there is shown an optical system which might include merely by way of example, multiple sources of radiant energy 10 projected onto a collecting lens 11 and passed to a projection lens 12 and further optical element 13. Assuming that it is desired to monitor the intensity of the beam from the lens 12, the optical element 13 may be provided with coatings of dissimilar materials such as indicated at 14 and 15. These materials are metals and have thermal electric properties such that temperature differences between the metals will result in generated thermal E.M.F.'s. The optical element 13 may constitute one of the actual optical elements in the optical system or may constitute a simple substrate of transparent material such as glass upon which the coatings or film layers 13 and 14 are deposited.

As illustrated in FIGURE 1, output electrical leads 16 and 17 extend from the film coatings 14 and 15 respectively and connect to an amplifier 18 and suitable signal indicator 19.

The basic theory of operation in the method is to monitor the electrical signals developed from thermal changes in the layers caused by the beam itself. Thus, an increase in beam intensity will result in a raising of the temperature of the metals to increase the output voltage signals therefrom. The dissimilar metals themselves have different properties so that there will be unique output signals for given intensities.

To avoid the introduction of errors due to changes in ambient temperature, a compensating thermocouple such as indicated at 20 is incorporated in series in the output lead 16. The metals forming the compensating thermocouple are the same as the metals employed in the film coatings 14 and 15.

Figures 2, 3, 4:
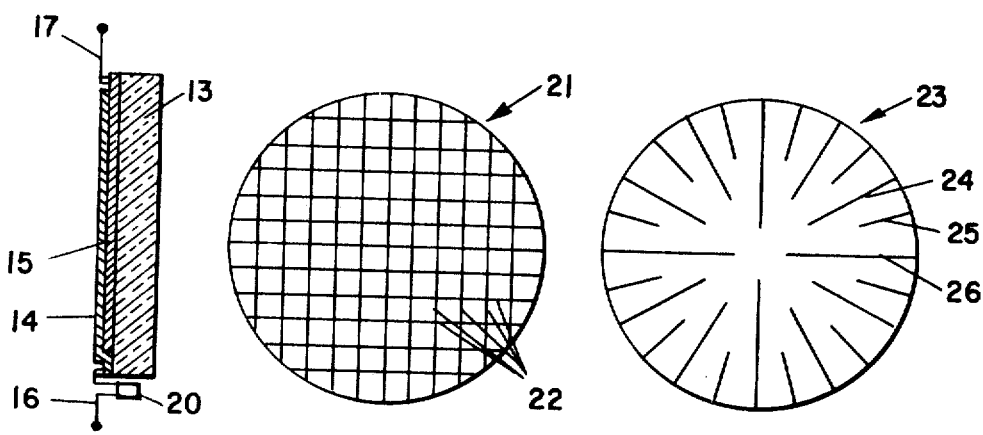
FIGURE 2 is a cross-section of one of the optical elements shown in FIGURE 1.
FIGURE 3 is a plan view of a typical film coating defining a grid mesh for carrying out the method; and, FIGURE 4 is a view similar to FIGURE 3 but illustrating a web or radial line type mesh for the deposited film.

Referring now to FIGURE 2, there is shown in cross-section and in somewhat exaggerated dimensions, the optical element 13 with the coatings 14 and 15 deposited thereon. As a specific example, the metals are vacuum deposited on the substrate or optical element 13 by conventional vacuum deposition methods. The actual metals employed may be spectrally selective if desired. An example of such metals would be gold and nickel. By employing such metals, it would be possible to favor detection of certain wave lengths being transmitted through the system.

In other instances, it would be desirable to provide relatively non-selective detection and towards this end, metals such as nickel and copper in an opaque pattern would be desirable. In this latter configuration, the copper would be on the outside or directed towards the source and would thus constitute the film coating or layer 14. By oxidizing the copper surface to a black oxide, a non-selective detector is provided.

The films 14 and 15 may be transparent to some extent so that the opacity can be varied from a few percent up to 100 percent. However, better control of opacity is realizable by using opaque line or mesh patterns.

FIGURE 3 illustrates an optical element or substrate 21 upon which has been deposited a film in the form of a grid mesh such as indicated by the horizontal and vertical lines 22. By adjusting the width of the lines defining the grid and the number of lines actually employed, the portion of the total optical element occluded by the pattern can be controlled.

In certain instances, it may be desirable to use a web type pattern such as illustrated on the optical element 23 in FIGURE 4. In this instance, the degree of opacity may be varied by varying the length of the radial line segments 24, 25, and 26.

In depositing the films illustrated in FIGURES 3 and 4, suitable masking must be employed during the depositing operation. The masking for a radial type pattern such as illustrated in FIGURE 4 would be somewhat more convenient than that for the grid pattern of FIGURE 3. Moreover, for the pattern of FIGURE 4, the masking could be modified to vary the length of the radial lines and thus the degree of eclipsing of the optical element 23.

In the case of transparent films, the effect on the spectral quality of the transmitted energy is relatively slight but is somewhat more than is the case when mesh or line patterns such as illustrated in FIGURES 3 and 4 are used. In the case of the transmitting films which are substantially uniform over the entire optical surface, the degree of opacity or undesirable effects of the film will be proportional to the film density. Spectral transmittance of thin metallic films is not thoroughly understood at this time. However, the tendency is towards providing better transmission of longer wavelengths.

In the actual operation of the apparatus, the beam will pass through the superimposed coatings 14 and 15 and heat the same to result in a thermal energy level. A voltage will be provided which may be detected through the amplifier 18 and voltmeter 19 which constitutes a direct function of this beam intensity. If changes in the ambient temperature occur while the beam intensity remains constant, such changes will affect both the layers and the compensating thermocouple 20 at the same time to provide compensating signals so that the output reading on the voltmeter 19 will be independent of ambient temperature.

If a change occurs in the beam intensity, the electromotive forces generated between the dissimilar metallic films 14 and 15 will change and this change will be indicated by the voltmeter 19 and may be calibrated with respect to the intensity so that a continuous monitoring of this intensity may be effected by simply monitoring the output signals from the coatings.

It will be clear that the central portion of the beam is at all times monitored and that slight changes in alignment in the optical system will not apprecibaly affect the accuracy of the monitoring method. Moreover, while a slight loss of transmission results from the use of the multiple coatings, this loss can be tolerated in most systems.

From the foregoing description, it will thus be evident that the present invention has provided a greatly improved method and apparatus for monitoring the intensity of a radiant energy beam. It should be understood that the system is applicable to ultraviolet and infra-red energy as well as light energy and is meant to encompass a large range in the electro-magnetic spectrum.

What is claimed is:

1. An apparatus for monitoring the intensity of a radiant energy beam while in use comprising: a transparent optical element adapted to constitute part of an optical system such that said beam passes through said element; first and second thin, dissimilar metal films deposited on said optical element in superimposed relationship and in direct contact with each other such that each intercepts at least a portion of said beam without appreciably attenuating the intensity of said beam; electrical output leads extending from said films respectively; and voltage measuring apparatus connected to said output leads for measuring voltage signals developed as a consequence of thermal effects resulting from the intensity of said beam on said films.

2. An apparatus according to claim 1, including a compensating thermocouple connected into one of said output leads for generating a thermal voltage responsive to ambient temperature of magnitude to compensate for thermal voltages generated by said first and second films in responsive to ambient temperature so that said output signals constitute a function only of the intensity of said beam.

3. An apparatus according to claim 1, in which each of said films is defined by opaque lines traversing at least a portion of the surface of said optical element to provide a mesh.

4. An apparatus according to claim 3, in which said mesh is in the form of a rectangular grid.

5. An apparatus according to claim 3 in which said mesh is defined by radial line segments of different lengths extending towards the center of said films.

References Cited

UNITED STATES PATENTS

| Re. 23,615 | 1/1953 | Fastie | 136—214 |
| 2,406,139 | 8/1946 | Fink et al. | 210—212 X |
| 2,407,678 | 9/1946 | Ohl | 136—215 X |
| 2,413,618 | 12/1946 | Graves et al. | 136—225 |
| 2,949,498 | 8/1960 | Jackson | 250—212 X |

WALTER STOLWEIN, *Primary Examiner.*